United States Patent
Chen et al.

(10) Patent No.: US 11,224,855 B2
(45) Date of Patent: Jan. 18, 2022

(54) METHOD OF REMOVING BORIC ACID FROM AN AQUEOUS SOLUTION

(71) Applicant: SINGAPORE UNIVERSITY OF TECHNOLOGY AND DESIGN, Singapore (SG)

(72) Inventors: Fuming Chen, Singapore (SG); Hui Ying Yang, Singapore (SG)

(73) Assignee: SINGAPORE UNIVERSITY OF TECHNOLOGY AND DESIGN, Singapore (SG)

( * ) Notice: Subject to any disclaimer, the term of this patent is extended or adjusted under 35 U.S.C. 154(b) by 0 days.

(21) Appl. No.: 17/217,127

(22) Filed: Mar. 30, 2021

(65) Prior Publication Data
US 2021/0291141 A1 Sep. 23, 2021

Related U.S. Application Data

(62) Division of application No. 16/062,625, filed as application No. PCT/SG2016/050601 on Dec. 13, 2016, now Pat. No. 10,981,144.

(51) Int. Cl.
*C02F 1/28* (2006.01)
*B01J 20/20* (2006.01)
(Continued)

(52) U.S. Cl.
CPC .............. *B01J 20/20* (2013.01); *B01J 20/205* (2013.01); *B01J 20/3085* (2013.01);
(Continued)

(58) Field of Classification Search
CPC ...... B01J 20/20; B01J 20/345; B01J 20/3217; B01J 20/3085; B01J 20/3416;
(Continued)

(56) References Cited

U.S. PATENT DOCUMENTS 3,468,764 A 9/1969 Cohen et al.
3,856,670 A 12/1974 Peterson
(Continued)

FOREIGN PATENT DOCUMENTS

CN 104226281 A 12/2014
CN 104984728 A 10/2015
(Continued)

OTHER PUBLICATIONS

Wen et al. "The removal of silicon and boron from ultra-pure water by electrodeionization" Desalination 181 (2005) p. 153-159, doi: 10.1016/j.desal.2005.02.018.
(Continued)

*Primary Examiner* — Matthew O Savage
(74) *Attorney, Agent, or Firm* — Moser Taboada

(57) ABSTRACT

The invention generally relates to a carbon-based boron removal medium with hydroxyl group and amine group, and in particular, to a method for forming the carbon-based boron removal medium. In various embodiments, nitrogen-doped ("N-doped") graphene oxide is synthesized by a simple two-step process: (1) oxidation of graphite to graphene oxide, and (2) nitrogen-doping ("N-doping") the graphene oxide to form the amine group. The resultant N-doped graphene oxide can efficiently remove boron from aqueous solutions. The invention also generally relates to a boron sensing medium and its use in conductometric measurement techniques to detect and measure the amount of boron present in aqueous solutions.

2 Claims, 11 Drawing Sheets

(51) Int. Cl.
| | |
|---|---|
| *B01J 20/32* | (2006.01) |
| *B01J 20/34* | (2006.01) |
| *B01J 20/30* | (2006.01) |
| *G01N 27/06* | (2006.01) |
| *C02F 101/10* | (2006.01) |

(52) U.S. Cl.
CPC ....... *B01J 20/3204* (2013.01); *B01J 20/3217* (2013.01); *B01J 20/3248* (2013.01); *B01J 20/345* (2013.01); *B01J 20/3416* (2013.01); *B01J 20/3475* (2013.01); *C02F 1/283* (2013.01); *C02F 1/285* (2013.01); *C02F 1/288* (2013.01); *G01N 27/06* (2013.01); *C02F 2101/108* (2013.01); *C02F 2303/16* (2013.01)

(58) Field of Classification Search
CPC .......................... B01J 20/3475; B01J 20/3204; B01J 20/3248; B01J 20/205; C02F 1/285; C02F 1/283; C02F 1/288; C02F 2303/16; C02F 2101/108; G01N 27/06
See application file for complete search history.

(56) References Cited

U.S. PATENT DOCUMENTS

| | | | |
|---|---|---|---|
| 4,204,259 | A | 5/1980 | Yabe |
| 4,755,298 | A | 7/1988 | Grinstead |
| 6,039,789 | A | 3/2000 | McMullen et al. |
| 6,884,356 | B2 | 4/2005 | Kosenka et al. |
| 7,094,349 | B2 | 8/2006 | Inoue et al. |
| 7,264,737 | B2 | 9/2007 | Godec et al. |
| 7,368,058 | B2 | 5/2008 | Nishikawa et al. |
| 7,641,054 | B2 | 1/2010 | Sasaki et al. |
| 7,811,457 | B2 | 10/2010 | Marston |
| 7,846,339 | B2 | 12/2010 | Suzuki et al. |
| 8,070,950 | B2 | 12/2011 | Suzuki |
| 8,236,180 | B2 | 8/2012 | Yabusaki |
| 8,357,300 | B2 | 1/2013 | Roh et al. |
| 8,602,222 | B2 | 12/2013 | Nakatsuji et al. |
| 8,616,380 | B2 | 12/2013 | Wang et al. |
| 2009/0223897 | A1 | 9/2009 | Villeneuve |
| 2010/0101996 | A1 | 4/2010 | Suzuki |
| 2010/0294722 | A1 | 11/2010 | Yabusaki |
| 2013/0118986 | A1 | 5/2013 | Diallo et al. |
| 2014/0224734 | A1 | 8/2014 | Abd Ellatif |
| 2014/0339162 | A1 | 11/2014 | Cao et al. |
| 2015/0053619 | A1 | 2/2015 | Cao et al. |

FOREIGN PATENT DOCUMENTS

| | | |
|---|---|---|
| CN | 105016501 A | 11/2015 |
| EP | 2149539 A4 | 5/2011 |
| EP | 1812149 B1 | 6/2013 |
| WO | WO-2012020680 A1 | 2/2012 |
| WO | WO-2014058696 A1 | 4/2014 |
| WO | WO-2015012054 A1 | 1/2015 |

OTHER PUBLICATIONS

J. W. Mitchell, W. M. Dugger and H. G. Gauch, "Science", 1953, 118, 354-355.
W. S. Hummers and R. E. Cffeman, "Journal of the American Chemical Society", 1958, 80, 1339-1339.
W. J. McIlrath, J. W. Mitchell, I. R. Schneider and H. G. Gauch, "Science", 1960, 132, 898-899.
S. Lee and S. Aronoff, "Science", 1967, 158, 798-799.
J. A. Rajaratnam, J. B. Lowry, P. N. Avadhani and R.H. V. Corley, "Science", 1971, 172, 1142-1143.
W.-W. Choi and K. Y. Chen, Environmental Science & Technology, 1979, 13, 189-196.
D.L. Harp, "Analytica Chimica Acta" 1997, 346, 373.
N. Bicak and B. F. Senkal, "Journal! of Applied Polymer Science", 1998, 68, 2113-2119.
D. Atanassova, V. Stefanova, E. Russeva, "Talanta" 1998, 47, 1237.
B. Pastina, J. Isabey, B. Hickel, "Journal of Nuclear Materials" 1999, 264, 309.
Y. Muramatsu, S. Uchida, K. Tagami, S. Yoshida, T. Fujikawa, Journal of Analytical Atomic Spectrometry 1999, 14, 859.
S.D. Kumar, B. Maiti, P.K. Mathur, "Analytical Chemistry" 1999, 71, 2551.
M.-O. Simonnot, C. Castel, M. Nicolai, C. Rosin, M. Sardin and H. Jauffret, "Water Research", 2000, 34, 109-116.
R. Wickham and R. Godec, "Semiconductor Pure Water and Chemicals Conference, Proceedings", 2001, 15-33.
C. Dilek, H. O. Ozbelge, N. Bicak, L. Yilmaz, Separation Science and Technology, 2002, 37, 1257-1271.
M. Badruk and N. Kabay, "International Geothermal Conference, Reykjavik, Sep. 2003", 2003, Session #14, 8-13.
B. F. Senkal and N. Bicak, "Reactive and Functional Polymers", 2003, 55, 27-33.
N. Ozttirk and D. Kavak, "Fresenius Environmental Bulletin", 2003, 12, 1450-1456.
H. Polat, A. Vengosh, I. Pankratov and M. Polat, "Desalination", 2004, 164, 173-188.
E.M. Shvarts, R.T.Ignash, R.G. Belousova, "Russian Journal of General Chemistry" 2005, 75, 1687.
D.M.C. Gomes, M.A. Segundo, J.L.F.C. Lima, A.O.S.S. Rangel, "Talanta" 2005, 66, 703.
O. P. Ferreira, S. G. de Moraes, N. Duran, L. Cornejo and O.L. Alves, "Chemosphere", 2006, 62, 80-88.
M. del Mar de la Fuente Garcia-Soto and E. M. Camacho, "Separation and Purification Technology", 2006, 48, 36-44.
N. Geffen, R. Semiat, M. S. Eisen, Y. Balazs, I. Katz and C. G. Dosoretz, "Journal of Membrane Science", 2006, 286,45-51.
R. Liu, W. Ma, C.-y. Jia, L. Wang and H.-Y.Li, "Desalination", 2007, 207, 257-267.
J.-Q. Jiang, Y. Xu, K. Quill, J. Simon and K. Shettle, "Industrial & Engineering Chemistry Research", 2007, 46, 4577-4583.
Y. Cengeloglu, A. Tor, G. Arslan, M. Ersoz and S. Gezgin, "Journal of Hazardous Materials", 2007, 142, 412-417.
C. Yan, W. Yi, P. Ma, X. Deng and F.Li, "Journal of Hazardous Materials", 2008, 154, 564-571.
N. Kabay, M. Bryjak, S. Schlosser, M. Kitis, S. Avlonitis, Z. Matejka, I. Al-Mutaz and M. Yuksel, "Desalination", 2008, 223, 38-48.
N. Oztiirk, D. Kavak and T. E. Kose, Desalination, 2008, 223,1-9.
N. Ozttirk and T. E. Kose, "Desalination", 2008, 227, 233-240.
Y. Xu and J.-Q. Jiang, "Industrial & Engineering Chemistry Research", 2008, 47, 16-24.
A. E. Yilmaz, R. Boncukcuoglu, M. M. Kocakerim, M. T. Yilmaz and C. Paluluoglu, "Journal of Hazardous Materials", 2008, 153, 146-151.
Y.-M. Liu, K. Lee, "Marine Chemistry" 2009, 115, 110.
WHO-Guidelines, "Background document for development of WHO Guidelines for Drinking-water Quality", 2009, WHO/HSE/WSH/09.01/2.
X. Li, H. Wang, J. T. Robinson, H. Sanchez, G. Diankov and H. Dai, "Journal of the American Chemical Society", 2009, 131, 15939-15944.
L. J. Banasiak and A.I. Schafer, "Journal of Membrane Science", 2009, 334, 101-109.
D. Kavak, Journal of Hazardous Materials, 2009, 163, 308-314.
Y. Shao, S. Zhang, M. H. Engelhard, G. Li, G. Shao, Y. Wang, J. Liu, I. A. Aksay and Y.Lin, "Journal of Materials Chemistry", 2010, 20, 7491-7496.
Morisada,S. et al., "Adsorption removal of boron in aqueous solutions by amine-modified tannin gel". Water Research, May 20, 2011, vol. 45, No. 13, p. 4028-4034.
P. Pirat, Boronline, "A new generation of boron meter, Advancements in Nuclear Instrumentation Measurement Methods and their Applications (ANIMMA)", 2011 2nd International Conference. IEEE, Ghent, 2011, p. 1.
H. Nagasawa, A.Iizuka, A. Yamasaki and Y. Yanagisawa, Industrial & Engineering Chemistry Research, 2011, 50, 6325-6330.

(56) References Cited

OTHER PUBLICATIONS

X. Zhai, J. Meng, R. Li, L. Ni and Y. Zhang, "Desalination", 2011, 274, 136-143.
F. Chen, S. Liu, J. Shen, L. Wei, A. Liu, M. B. Chan-Park and Y. Chen, "Langmuir", 2011, 27, 9174-9181.
K. Ikeda, D. Umeno, K. Saito, F. Koide, E. Miyata and T. Sugo, "Industrial & Engineering Chemistry Research", 2011, 50, 5727-5732.
N. Hilal, G. J. Kim and C. Somerfield, "Desalination", 2011, 273, 23-35.
R. Bernstein, S. Belfer and V. Freger, "Environmental Science & Technology", 2011, 45, 3613-3620.
M. Parsaei, M. S. Goodarzi and M. M. Nasef, "2077 2nd International Conference on Environmental Science and Technology", 2011, 6, VI-398-V391-402.
N. Wang, F.-T. Cao, X.-N. Liu, "Chemical Journal of Chinese Universities", 2012, 33, 2795-2800.
M. Gazi and S. Shahmohammaidi, "Reactive and Functional Polymers", 2012, 72, 680-686.
H. Che Man, W. H. Chin, M. R. Zadeh and M. R. M. Yusof, "BioResources", 2012, 7(3), 3810-3822.
Ezerie Henry Ezechi, M. H. Isa and S. R. B. M. Kutty, "Journal of Applied Sciences", 2012, 12, 402-415.
M. V. S. Elena Borokhov Akerman, Vitaly Gitis, "Desalination and Water Treatment", 2012, 46, 285-294.
G. Wang, L.-T. Jia, Y. Zhu, B. Hou, D.-B. Li and Y.-H. Sun, RSC Advances, 2012, 2, 11249-11252.
N. H. T. Azhar Abdul Halim, Normah Awang and Mohd Talib Latif, "American Journal of Environmental Sciences", 2012, 8, 322-327.
A. Pakdel, X. Wang, C. Zhi, Y. Bando, K. Watanabe, T. Sekiguchi, T. Nakayama and D. Golberg, "Journal of Materials Chemistry", 2012, 22, 4818-4824.
T. T. Kurkumin, A. A. Halim, N. A. Roslan, N. S. Yaacub and M. T. Latif, "Sains Malaysiana", 2013, 42, 1293-1300.
M.H.S. Ismail, X. T. Zhang, M. F. M. Lazim, "Pol. J Environ. Stud.", 2013, 22, 403-408.
L. Wei, F. Chen, H. Wang, T. H. Zeng, Q. Wang and Y. Chen, "Chemistry—An Asian Journal", 2013, 8, 437-443.
J. Wolska and M. Bryjak, "Desalination", 2013, 310, 18-24.
N. Thakur, S. A. Kumar, R. N. Shinde, A. K. Pandey, S. D. Kumar and A. V. R. Reddy, "Journal of Hazardous Materials", 2013, 260, 1023-1031.
K. Missaoui, W. Bouguerra, C. Hannachi and B. Hamrouni, "Journal of Water Resource and Protection", 2013, 5, 867-875.
D.A. Kose, B. Zumreoglu-Karan, O. Sahin, O. Buyukgungor, "Boric acid complexes with thiamine (vitamin B1) and pyridoxine (vitamin B6)", Inorganica Chimica Acta, vol. 413, Mar. 24, 2014, pp. 77-83.
E. H. Ezechi,M. H. Isa, S. R. M. Kutty and A. Yaqub, "Process Safety and Environmental Protection", 2014, 92, 509-514.
F.B. A. Korkmaz M., Ozmetin C., Yaar Y., "Bulgarian Chemical Communications", 2014, 46, 594-601.
A. Iizuka, M. Takahashi, T. Nakamura and A. Yamasaki, Industrial & Engineering Chemistry Research, 2014, 53, 4046-4051.
F. M. Nima Zohdi, Luqman Chuah Abdullah and Thomas SY Choong, "Journal of Environmental Health Sciences & Engineering", 2014, 12, 1-12.
T. He, X. Guo, K. Zhang, Y. Feng and X. Wang, "RSC Advances", 2014, 4 5880-5886.
D. Sarkar, A.A. Sheikh, K. Batabyal, B. Mandal, "Communications in Soil Science and Plant Analysis" 2014, 45, 1538.
P. Ahmad, M. U. Khandaker, Y. M. Amin, N. Muhammad, A. R. Usman and M. Amin, "New Journal of Chemistry", 2015, 39, 7912-7915.
J. Kluczka, T. Korolewicz, M. Zolotajkin and J. Adamek, "Water Resources and Industry", 2015, 11, 46-57.
Deepan, P. G. et al., "Synthesis and characterization of nitrogen-doped graphene sheets by hydrothermal reduction method", international Journal of ChemTech Research, Feb. 6, 2015, vol. 7, No. 3, pp. 1553-1558.
Tian, Z. et al., One-Pot Hydrothermal Synthesis of Nitrogen-Doped Reduced Graphene Oxide Hydrogel. Science of Advanced Materials, Jul. 31, 2015, vol. 7, No. 7, pp. 1415-1423.
Chen, F. et al., Nrtrogen-doped graphene oxide tor effectively removing boron ions from seawater. Nanoscale, Nov. 22, 2016, vol. 9, pp. 326-333.

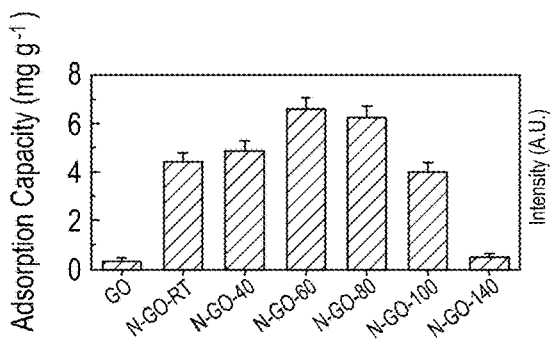
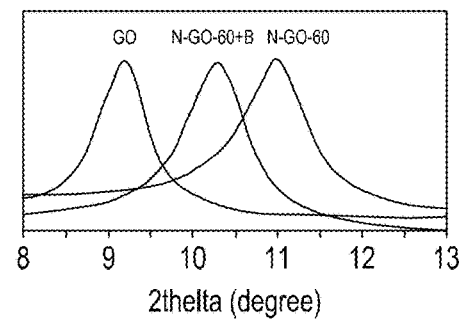
FIG. 3A  FIG. 3B
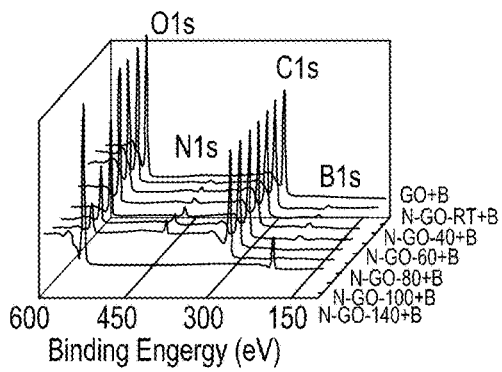
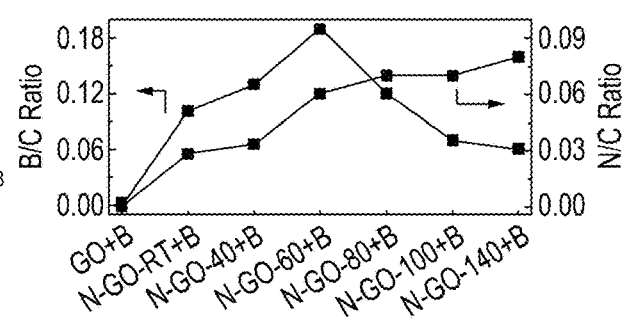
FIG. 3C  FIG. 3D
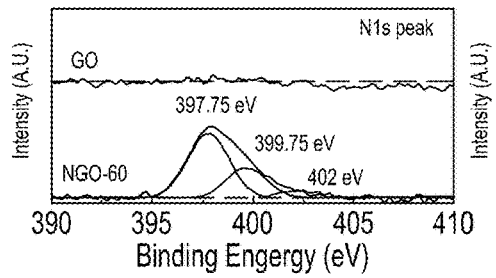
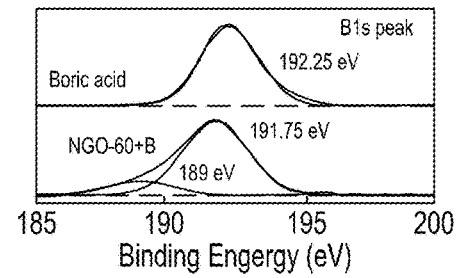
FIG. 3E  FIG. 3F
Table 1: the boron absorption capacity and the corresponding removal efficiency (%) of N-GO at various temperatures during hydrothermal treatment
FIG. 3G
| N-GO-x (x=hydrothermal temperature) | Absorption Capacity (mg/g) | Removal Efficiency (%) |
|---|---|---|
| GO | 0.28 | 2.29 |
| N-GO-RT | 4.37 | 34.96 |
| N-GO-40 | 4.81 | 38.48 |
| N-GO-60 | 6.55 | 52.43 |
| N-GO-80 | 6.21 | 48.89 |
| N-GO-100 | 3.97 | 31.76 |
| N-GO-140 | 0.47 | 3.74 |

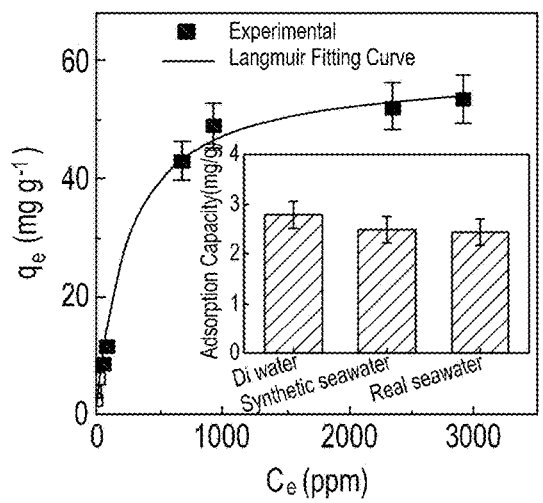
FIG. 5A
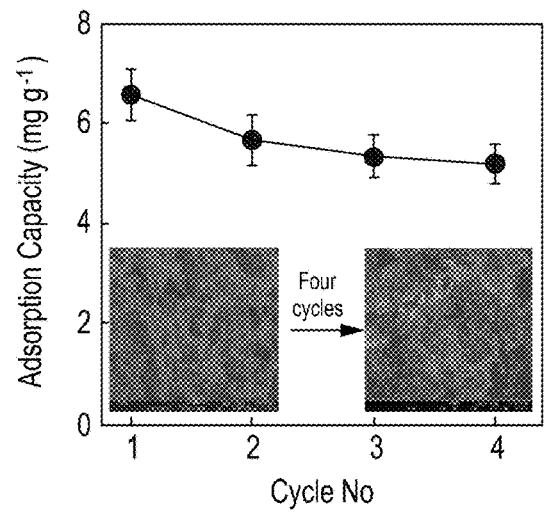
FIG. 5B
Table 2: Parameters of Langmuir absorption isotherm for N-GO-60 media at 25 °C, pH=8.5
| Equation: qe=Qm*K$_L$*Ce/(1+K$_L$*Ce) | | |
|---|---|---|
| $R^2$ | 0.9853 | |
|  | Value | Standard Error |
| $Q_m$ | 58.69875 | 2.63124 |
| $K_L$ | 0.00409 | 8.81507E-4 |
FIG. 5C Table 3. Performance comparison of the maximum absorption capacity with other media

| Boron Absorption Media | Maximum Absorption Capacity (mg/g) |
|---|---|
| N-GO (Present Work) | 58.70 |
| Dowex 2×8 anion exchange resin | 16.98 |
| Polystyrene-based resin grafted with glycidol | 1.3 |
| Polymer supported iminodipropylene glycol functions | 32 |
| Sorbitol-Modified Poly (N-glycidyl styrene sulfonamide) | 13.18 |
| Iminobis-(propylene glycol) modified chitosan beads | 29.19 |
| Unmodified rice husk | 4.23 |
| Calcine Alunite | 3.39 |
| Neutralized Red Mud | 5.99 |
| Fly Ash | 20.9 |
| Cotton | 11.3 |
| Curcumin-impregnated Activated Carbon | 5.00 |
| Magnetic carbon nanotube improved with tartaric acid | 1.53 |
| Purolite S 108 resin | 12.87 |
| Crosslinking of poly(vinylbenzyl chloride) with a cyclic diamine piperazine | 28 |
| Aquatic Booster | 1.42 |
| Hydrotalcite-like compounds | 14.0 |
| Acetyl-meglumine Resin | 28.1 |

FIGURE 6

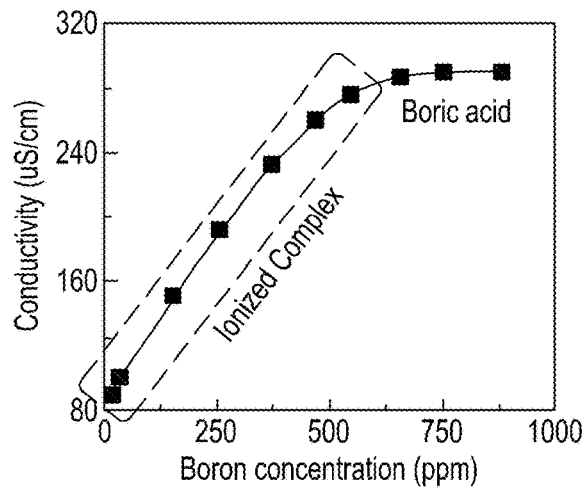
FIG. 15A
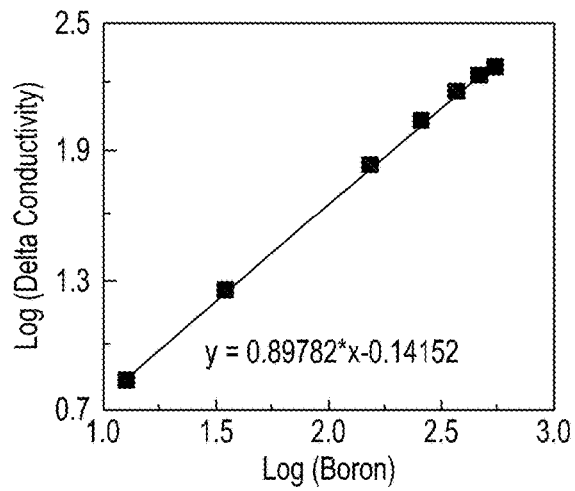
FIG. 15B
Table 4: shows the fitting parameters in Figure 9(b)
| Equation: y = a + b*x | | |
|---|---|---|
| $R^2$ | 0.99882 | |
| | Value | Standard Error |
| Intercept | -0.14152 | 0.02836 |
| Slope | 0.89782 | 0.01261 |
FIG. 15C Table 5: The fitting parameters of vitamin B6 and mannitol in ppm range as boron

| Equation: y = a + b*x | | | | | |
|---|---|---|---|---|---|
| | $R^2$ | Y slope | Y slope Standard Error | Y Intercept | Y Intercept Standard Error |
| Vitamin B6 | 0.99882 | 0.89782 | 0.01261 | -0.14152 | 0.02836 |
| Mannitol | 0.98997 | 0.46926 | 0.00848 | 0.53555 | 0.02698 |

METHOD OF REMOVING BORIC ACID FROM AN AQUEOUS SOLUTION

CROSS-REFERENCE TO RELATED APPLICATIONS

This application is a divisional application of U.S. patent application Ser. No. 16/062,625, filed Jun. 14, 2018, which is a National Stage Entry of PCT/SG2016/050601, filed on Dec. 13, 2016, which claims the benefit of and priority to Singapore Patent Application No. 10201510400S, filed Dec. 17, 2015, and Singapore Patent Application No. 10201510403T, filed Dec. 17, 2015, the entire contents of each of these applications is incorporated herein by reference.

TECHNICAL FIELD

The invention generally relates to a carbon-based boron removal medium with hydroxyl group and amine group, and in particular, to a method for forming the carbon-based boron removal medium. In various embodiments, nitrogen-doped ("N-doped") graphene oxide is synthesized by a simple two-step process: (1) oxidation of graphite to graphene oxide, and (2) nitrogen-doping ("N-doping") the graphene oxide to form the amine group. The resultant N-doped graphene oxide can efficiently remove boron from aqueous solutions. The invention also generally relates to a boron sensing medium and its use in conductometric measurement techniques to detect and measure the amount of boron present in aqueous solutions.

BACKGROUND

Boron is a naturally occurring element in the environment. Its presence comes mainly in the form of boric acid ($H_3BO_3$) or borate ions ($B(OH)_4^-$, $B_4O_7^{2-}$, $H_3BO_2^-$) or salts. Its aqueous solution plays an important role in many application fields, e.g. in a middle-scale semiconductor factory, million tons of pure water with ppb (parts per billion) level of boron is daily consumed during the manufacture process, higher boron concentration might cause defects due to the p-type dopant in semiconductor chip manufacturing, and leak might happen.

In irrigation water, boron content must not exceed 1 ppm (parts per million). Its deficiency and excess are harmful to the normal growth of plants. On one hand, boron deficiency may reduce absorption of calcium, magnesium and phosphorus in the growth and functioning of plants. On the other hand, excess boron can result in dwarfing or death of plants.

For potable water, the World Health Organization (WHO) recommends a guideline concentration of boron up to 2.4 mg/L level in 2011. Increased boron content causes problems in cardiovascular, coronary, nervous and reproductive systems. It is particularly dangerous for pregnant women to take excess of boron because of the risk of birth pathology.

The concentration of boron is approximately 5 ppm in seawater. In seawater desalination, reverse osmotic membrane, capacitive desalination, and electro-dialysis desalination are the most popular technologies. However, none of them can efficiently remove boron from seawater due to its small size and uncharged species of boric acid at pH 8.4. In this case, additional post-treatment processes are needed to remove boron during the seawater desalination. These post-treatment processes include electrocoagulation, chemical precipitation, ion exchange processes, and liquid-liquid extraction. However, most of these methods are inefficient in solutions of low boron concentrations or adjustment of pH is required.

Accordingly, there remains a need to provide for an improved boron removal medium and method that overcome, or at least alleviate the above drawbacks by controlling and keeping the boron concentration within the applicable limit.

SUMMARY

According to one aspect of the invention, there is provided a method of removing or reducing the amount of boron present in an aqueous solution, wherein the boron exists in a form of boric acid ($H_3BO_3$) or borate ions ($B(OH)_4^{-1}$, $B_4O_7^{2-}$, $H_3BO_2^-$) in the aqueous solution. The method includes contacting a boron removal medium with the aqueous solution, wherein the boron removal medium includes a carbon-based material comprising at least one hydroxyl group and at least one pyridinic nitrogen, or pyrrolic nitrogen, or graphitic nitrogen, or amine group. The method further includes separating the boron removal medium from the aqueous solution.

According to another aspect of the invention, there is provided a boron removal medium for use in removing or reducing the amount of boron present in an aqueous solution, wherein the boron exists in a form of boric acid ($H_3BO_3$) or borate ions ($B(OH)_4^-$, $B_4O_7^{2-}$, $H_3BO_2^{-3}$) in the aqueous solution, wherein the boron removal medium includes a carbon-based material comprising at least one hydroxyl group and at least one pyridinic nitrogen, or pyrrolic nitrogen, or graphitic nitrogen, or amine group.

According to yet another aspect of the invention, there is provided a method of forming a boron removal medium for use in removing or reducing the amount of boron present in an aqueous solution, wherein the boron exists in a form of boric acid ($H_3BO_3$) or borate ions ($B(OH)_4^-$, $B_4O_7^{2-}$, $H_3BO_2^-$) in the aqueous solution, wherein the boron removal medium includes a nitrogen-doped graphene oxide. The method includes oxidizing graphite to graphene oxide and subsequently doping the graphene oxide with ammonia.

According to a further aspect of the invention, there is provided a method of regenerating a used boron removal medium of the earlier aspect. The method includes contacting the used boron removal medium with an acid and rinsing the used boron removal medium with deionized water.

According to yet a further aspect of the invention, there is disclosed a method of detecting and quantifying the amount of boron present in an aqueous solution, wherein the boron exists in a form of boric acid ($H_3BO_3$) or borate ions ($B(OH)_4^-$, $B_4O_7^{2-}$, $H_3BO_2^{-1}$) in the aqueous solution. The method includes contacting a boron removal medium of the earlier aspect with a first sample of the aqueous solution to remove boron. The method further includes contacting a first boron sensing medium with the first sample of the aqueous solution after removal of boron, wherein the first boron sensing medium comprises at least two hydroxyl groups and at least one pyridinic nitrogen, or pyrrolic nitrogen, or quaternary nitrogen. The method also includes obtaining a first conductivity measurement by measuring conductivity of the first sample of the aqueous solution after removal of boron and contact with the first boron sensing medium. The method further includes contacting a second boron sensing medium with a second sample of the aqueous solution to form a complex with boron in the second sample, wherein the second boron sensing medium comprises at least two hydroxyl groups and at least one pyridinic nitrogen, or pyrrolic nitrogen, or quaternary nitrogen. The method further includes obtaining a second conductivity measurement by measuring conductivity of the second sample of the aqueous solution after formation of the complex and correlating the difference in the first and second conductivity measurements to the amount of boron present in the aqueous solution.

According to yet another aspect of the invention, use of a boron sensing medium in detecting and quantifying the amount of boron present in an aqueous solution by a conductometric measurement technique is disclosed, wherein the boron exists in a form of boric acid ($H_3BO_3$) or borate ions ($B(OH)_4^-$, $B_4O_7^{2-}$, $H_3BO_2^{-1}$) in the aqueous solution, wherein the boron sensing medium comprises at least two hydroxyl groups and at least one pyridinic nitrogen, or pyrrolic nitrogen, or quaternary nitrogen.

BRIEF DESCRIPTION OF THE DRAWINGS

In the drawings, like reference characters generally refer to the same parts throughout the different views. The drawings are not necessarily drawn to scale, emphasis instead generally being placed upon illustrating the principles of various embodiments. In the following description, various embodiments of the invention are described with reference to the following drawings.

FIG. 3A shows the boron absorption capacity of N-GO at various temperatures; FIG. 3B shows XRD pattern of GO, NGO-60 and NGO-60+B, FIG. 3C shows XPS spectra of GO+B, NGO-x+B, and boric acid; FIG. 3D shows N-doped atomic ratio of N/C, and the ratios of B/C of the samples calculated from XPS results; FIG. 3E shows high resolution N1s spectra of GO and N-GO-60; FIG. 3F shows high resolution B1s spectra of boric acid and N-GO-60+B. FIG. 3G is Table 1 that shows the boron absorption capacity and the corresponding removal efficiency (%) of N-GO at various temperatures during hydrothermal treatment.

FIG. 5A shows Langmuir isotherms at the temperature 25° C., pH 8.5. Insert: the adsorption performance in DI water synthetic seawater and real seawater (25 ml boron feed solution with 5 ppm boron was mixed with 40 mg N-GO media for 48 hours); FIG. 5B shows the regeneration of N-GO-60 using acid (25 ml boron feed solution with 20 ppm boron was mixed with 40 mg N-GO media for 48 hours). FIG. 5C is Table 2 that shows parameters of Langmuir absorption isotherm for N-GO-60 media at 25° C., pH=8.5.

FIG. 6 shows Table 3. Performance comparison of the maximum absorption capacity with other media.

FIG. 15A shows the conductivity versus boron concentration in DI water; and FIG. 15B shows the form of log-log from the marked part. FIG. 15C is Table 4 that shows the fitting parameters in FIG. 15B.

DESCRIPTION

Figure 1:
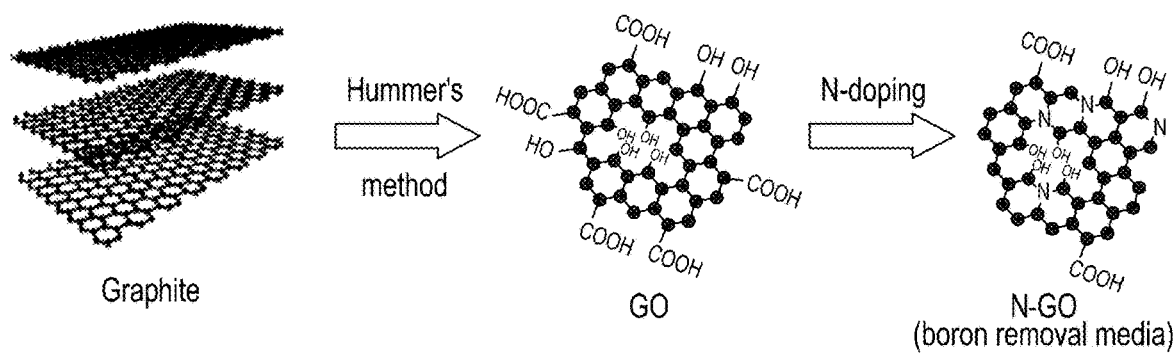
FIG. 1 shows a two-step process to synthesize nitrogen-doped graphene oxide. Graphite was oxidized into graphene oxide, followed by the nitrogen doping through hydrothermal treatment using ammonia.

The following detailed description refers to the accompanying drawings that show, by way of illustration, specific details and embodiments in which the invention may be practised. These embodiments are described in sufficient detail to enable those skilled in the art to practise the invention. Other embodiments may be utilized, and structural, logical, chemical and electrical changes may be made without departing from the scope of the invention. The various embodiments are not necessarily mutually exclusive, as some embodiments can be combined with one or more other embodiments to form new embodiments.

In aqueous solutions, boron exists in a form of boric acid ($H_3BO_3$) or borate ions ($B(OH)_4^-$, $B_4O_7^{2-}$, $H_3BO_2^-$). According to one aspect of the invention, there is provided a method of removing or reducing the amount of boron present in an aqueous solution by forming a borate complex. The method comprises contacting a boron removal medium with the aqueous solution to react with the boric or borax species to form the borate complex. The method further comprises separating the boron removal medium from the aqueous solution.

The boron removal medium may comprise a carbon-based material. The carbon-based boron removal medium may comprise at least one hydroxyl group and at least one pyridinic nitrogen, or pyrrolic nitrogen, or graphitic nitrogen, or amine group. In other words, there is always one or more hydroxyl groups in the carbon-based boron removal medium.

In various preferred embodiments, the carbon-based material may comprise at least two hydroxyl groups and at least one pyridinic nitrogen, or pyrrolic nitrogen, or graphitic nitrogen, or amine group.

In various alternative preferred embodiments, the carbon-based material may comprise at least four hydroxyl groups and at least one pyridinic nitrogen, or pyrrolic nitrogen, or graphitic nitrogen, or amine group.

Preferably, the carbon-based material comprises at least one of graphene, graphite, graphene oxide, carbon nanotube, activated carbon, lonsdaleite, fullerene, carbon fibre, carbon black, charcoal, and amorphous carbon.

More preferably, the carbon-based material is doped, such as nitrogen-doped.

In certain preferred embodiments, the carbon-based material may comprise nitrogen-doped (N-doped) graphene oxide or N-doped reduced graphene oxide. In one exemplified embodiment where N-doped graphene oxide is used as the boron removal medium, the boron absorption capacity can be up to 6.154 mg/g for N-graphene oxide synthesized at 60° C. hydrothermal treatment.

The hydroxyl group and the pyridinic nitrogen, or pyrrolic nitrogen, or graphitic nitrogen, or amine group of the carbon-based material may be directly covalently bound to the carbon-based material. Alternatively, the hydroxyl group and the pyridinic nitrogen, or pyrrolic nitrogen, or graphitic nitrogen, or amine group of the carbon-based material may be covalently bound to the carbon-based material via a linker small molecule.

In various embodiments, the separating may comprise centrifuging or filtering the aqueous solution, or the separating may comprise passing water through the boron removal medium.

According to another aspect of the invention, there is provided a method of forming the present boron removal medium for use in removing or reducing the amount of boron present in an aqueous solution, wherein the boron exists in a form of boric acid ($H_3BO_3$) or borate ions ($B(OH)_4^-$, $B_4O_7^{2-}$, $H_3BO_2^-$) in the aqueous solution.

In various embodiments where the boron removal medium comprises a nitrogen-doped graphene oxide, the method comprises oxidizing graphite to graphene oxide, followed by doping the graphene oxide with ammonia to thereby form the N-doped graphene oxide. By subjecting the graphene oxide to N-doping, amine groups can be grown on the graphene oxide in order to enhance the boron absorption ability.

The N-doped graphene oxide may comprise at least one hydroxyl group and at least one pyridinic nitrogen, or pyrrolic nitrogen, or graphitic nitrogen, or amine group. The hydroxyl group may come from the oxidation of the graphite material. Alternatively, the hydroxyl group may come from the transformation of a function group, preferably a carboxyl group, or carbonyl group. In other embodiments, the hydroxyl group may come from another small molecule comprising a hydroxyl group coupled to a carbon material.

In various embodiments, the nitrogen doping may come from the hydrothermal treatment of carbon materials with ammonia in an autoclave.

In further embodiments, the nitrogen doping may come from ammonia or nitrogen plasma treatment of carbon materials.

In yet further embodiments, the nitrogen doping may come from a direct synthesis of nitrogen doping of carbon materials.

In other embodiments, the nitrogen doping may come from $N^+$ ion-irradiated carbon materials.

In still further embodiments, the nitrogen doping may come from a thermal treatment of carbon materials with ammonia.

Alternatively, the nitrogen doping may come from a chemical treatment of carbon materials, preferably hydrazine, or other small molecule with nitrogen or amine group coupled to a carbon material.

Another advantage of the present boron removal medium is the ease of regenerating a used medium. Accordingly, another aspect of the invention relates to a method of regenerating a used boron removal medium. The method comprises contacting the used boron removal medium with an acid, followed by rinsing the used boron removal medium with deionized water.

Suitable acids include, but not limited to, sulfuric acid ($H_2SO_4$) and hydrochloric acid (HCl).

The presently disclosed boron removal medium and method of removing or reducing the amount of boron present in an aqueous solution can be extended to a method of detecting and quantifying the amount of boron present in an aqueous solution.

Accordingly, a further aspect of the disclosure relates to a method of detecting and quantifying the amount of boron present in an aqueous solution, wherein the boron exists in a form of boric acid ($H_3BO_3$) or borate ions ($B(OH)_4^-$, $B_4O_7^{2-}$, $H_3BO_2^-$) in the aqueous solution.

The method includes contacting a boron removal medium of the earlier aspect with a first sample of the aqueous solution to remove boron.

The method further includes contacting a first boron sensing medium with the first sample of the aqueous solution after removal of boron, wherein the first boron sensing medium comprises at least two hydroxyl groups and at least one pyridinic nitrogen, or pyrrolic nitrogen, or quaternary nitrogen.

The method also includes obtaining a first conductivity measurement by measuring conductivity of the first sample of the aqueous solution after removal of boron and contact with the first boron sensing medium.

The method further includes contacting a second boron sensing medium with a second sample of the aqueous solution to form a complex with boron in the second sample, wherein the second boron sensing medium comprises at least two hydroxyl groups and at least one pyridinic nitrogen, or pyrrolic nitrogen, or quaternary nitrogen.

The method further includes obtaining a second conductivity measurement by measuring conductivity of the second sample of the aqueous solution after formation of the complex and correlating the difference in the first and second conductivity measurements to the amount of boron present in the aqueous solution.

In various embodiments, each of the first and second boron sensing media comprises at least two hydroxyl groups and at least one pyrrolic nitrogen. For example, the first and/or second boron sensing medium may comprise three hydroxyl groups and one pyrrolic nitrogen. One disclosed embodiment of the first and/or second boron sensing medium is pyridoxine (i.e., vitamin $B_6$) illustrated in FIG. 8.

Alternatively, each of the first and second boron sensing media may comprise at least four hydroxyl groups and at least two pyrrolic nitrogen.

In yet further embodiments, each of the first and second boron sensing media comprises pyridoxine or a derivative thereof.

Advantageously, the method disclosed herein enable the detection and quantification of the amount of boron in the ppm, ppb, and even ppt levels.

According to yet another aspect of the invention, use of a boron sensing medium in detecting and quantifying the amount of boron present in an aqueous solution by a conductometric measurement technique is disclosed, wherein the boron exists in a form of boric acid ($H_3BO_3$) or borate ions ($B(OH)_4^-$, $B_4O_7^{2-}$, $H_3BO_2^-$) in the aqueous solution, wherein the boron sensing medium comprises at least two hydroxyl groups and at least one pyridinic nitrogen, or pyrrolic nitrogen, or quaternary nitrogen.

In order that the invention may be readily understood and put into practical effect, particular embodiments will now be described by way of the following non-limiting examples.

EXAMPLES

Example 1. Nitrogen-Doped Graphene Oxide Toward Effective Removing Boron Ions from Sea Water In this example, it is demonstrated the synthesis of a novel boron removal medium, namely nitrogen-doped graphene oxide (N-GO), via a simple two-step process: (1) oxidation of carbon material to form the —OH group, (2) nitrogen-doped by hydrothermal method to incorporate nitrogen into graphene oxide in order to enhance the boron adsorption ability. Significantly, the N-GO can be directly used in seawater without any treatment, which is not common for most of the other current technologies. N-GO exhibits the adsorption capacity of 6.55 mg/g media at 25 ml of feed with 20 ppm boron for 40 mg media, and the corresponding rejection is 52.40%. In 5 ppm boron feed, this media can achieve a boron rejection up to 91.12%. In real seawater with 5 ppm of boron, N-GO also shows an up to 2.42 mg/g capacity, which corresponds to 77.44% rejection. The maximum adsorption capacity is 58.7 mg/g based on Langmuir adsorption isotherm, the highest among all the sorbents products at present. The high adsorption capability of N-GO was shown to be attributed to the high amount of hydroxyl group and the surface area of graphene oxide, as well as the enhanced adsorption from nitrogen-doped effect. The influences from pH, other ions, kinetics adsorption were investigated. It was found that the N-GO media is extremely effective in a wide range of pH conditions as well as in real conditions of seawater. Moreover, this boron removal media can be easily regenerated for further use with a simple acid treatment. Therefore, the promising result reported herein has a strong potential to greatly impact the field of boron removal, particularly in the water industry.

Materials.

Graphite powder, aqueous ammonia (28 wt %), 30 wt % $H_2O_2$, $NaNO_3$, $K_2S_2O_8$, $P_2O_5$ and $KMnO_4$ were purchased from Sigma-Aldrich. 65 wt % $HNO_3$ and 98 wt % $H_2SO_4$ were bought from Merck. All the reagents were used as received without further purification.

Preparing Graphene Oxide.

Preparation of graphene oxide (GO): Graphene oxide (GO) was synthesized using natural graphite powders by a modified Hummers method. Briefly, 2 g of graphite powder was added into a mixture of 12 ml of 98% $H_2SO_4$, 2.5 g $K_2S_2O_8$, and 2.5 g of $P_2O_5$. The solution was kept at 80° C. for 4.5 h followed by thorough washing with water (through filtration) and oven drying at 60° C. Subsequently, the as-treated graphite was put into a beaker, and 100 ml of $H_2SO_4$ were added while keeping the beaker in an ice bath. Afterwards, 13 g of $KMnO_4$ was then added slowly. After 5 min, the ice bath was removed, and the solution was heated up and kept at 35° C. under vigorous stirring for 4 h, followed by the slow addition of 200 ml of water. Finally, 16 ml $H_2O_2$ was added, followed by centrifugation and washing with 1 litre dilute HCl (1 HCl:10 DI water). The exfoliation of GO was achieved by sonication.

Preparing N-Doped Graphene Oxide as Boron Removal Media.

Some amounts of aqueous ammonia (8 ml, 28 wt %) was added into the above dispersion of GO (37.5 ml, 4 mg/ml) under magnetic stirring. Then the mixture was transferred into Teflon-lined autoclave at room temperature and heated at 40° C.-140° C. for 5 h without stirring before natural cooling. The products of nitrogen-doped graphene oxide were rinsed with DI water to remove the excessive or physisorbed ammonia, and the powder form of products were collected as boron removal media.

Boron Removal and Measurement.

In the batch system, 25 ml boron feed solution with 20 ppm boron was mixed with 40 mg N-doped graphene oxide, kept stirring for 48 h, followed by centrifuge or filtration with 220 nm nylon filter paper, the filtered solution was collected for boron analysis. The following equation was used to calculate boron adsorption capacity at equilibrium:

$$q_e = (c_o - c_e) V/M \qquad (1)$$

where $C_o$ (mg/l) and $C_e$ (mg/l) are defined as the initial and final concentrations of boron respectively, V (l) is considered as the volume of the solution and M (g) is the mass of N-GO media. Boron rejection can be calculated based on the equation: Boron Rejection (%)=$(1-C_e/C_o)*100\%$. ICPE-9820 plasma atomic emission spectrometer was used to analysis the boron concentration. X-ray photoelectron spectroscopy (XPS) analyses were conducted by PHI Quantera II with a monochromatic Al Kα X-ray source (1486 eV) to investigate the surface chemistries of the obtained samples.

Regeneration Process of Boron Removal Media.

For a typical regeneration process, 3-5 bed volume (BV) of an aqueous solution of 5% HCl or $H_2SO_4$ is applied and the regenerate contact time was kept for 60 min. Thereafter, the medium is rinsed with 8~10 BV of DI water. At the conversion step, 3-5 BV of 2.5% NaOH was used, and followed by the DI water rinse.

Results and Discussions

N-GO Synthesis Process and Analysis.

Figure 2A:
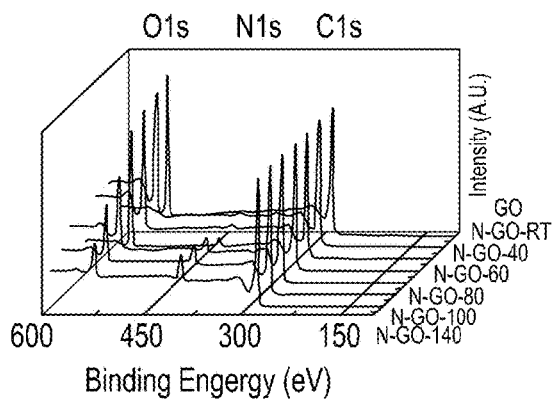
FIG. 2A shows XPS spectra of GO, and NGO-x.
Figure 2B:
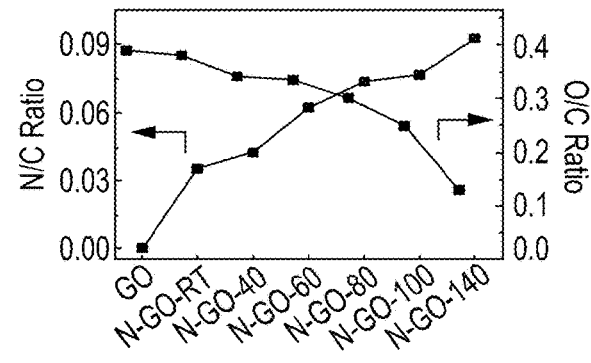
FIG. 2B shows atomic ratio of N/C, and O/C of the samples calculated from XPS results.

FIG. 1 describes the synthesis of N-GO in two simple steps. During the first step, graphite is oxidized and exfoliated into graphene oxide (GO) by a modified Hummer's method. Following that, a hydrothermal step involving GO and aqueous ammonia are applied to obtain N-GO. After the hydrothermal treatment, the color of N-GO solutions changed from brown to dark brown, suggesting a partial removal of oxygen-containing functional groups. XPS spectra of GO, and NGO-x were shown in FIG. 2A. The samples are denoted as N-GO-x, where x represents the reaction temperature (in ° C.) during hydrothermal treatment. An increase in the intensities of N1s peak at ~400 eV with increasing reaction temperatures indicates that nitrogen doping has occurred for the GO. The doping of GO occurs via the formation of covalently bonded nitrogen and simultaneous de-oxygenation of several oxygenated functional groups on the surface of GO, and the atomic ratio of N/C and O/C was shown in FIG. 2B based on the XPS results. The extent of nitrogen doping is directly proportional to the reaction time and hydrothermal temperature where longer reaction times and higher temperatures produce a greater amount of nitrogen doped sites.

Boron Absorption Properties of N-GO-x and Characterization.

In a typical boron removal experiment, 25 ml of boron feed solution at a concentration of 20 ppm boron is mixed with 40 mg of N-doped GO and stirred for 48 h followed by centrifugation or filtration in a batch study. The filtered solution is collected for boron analysis and the adsorption capacity is calculated. FIG. 3A shows the boron adsorption capacity of GO and N-GO-x (where x=RT, 40, 60, 80, 100 and 140° C.). The optimal hydrothermal temperature is around 60° C., where the boron adsorption capacity is up to 6.55 mg/g N-GO. A summary of the present experiments is shown in Table 1 (FIG. 3E). At an increased temperature above 80 the boron adsorption capacity decreases exponentially with increasing reaction temperatures. This can be attributed to a significant reduction of —OH functional groups. As a result, the boron complexes are unable to form. Ammonia concentration used during the hydrothermal step is another factor which can affect the adsorption capacity. The optimal ammonia concentration is found to be between 2% and 3% for 150 mg GO (not shown). At low ammonia levels, there is negligible nitrogen doping which results in the low boron adsorption capacities. At high ammonia concentrations, the increase in nitrogen doping and the reduction effect from the excess ammonia may result in the excessive loss of hydroxyl group in GO (not shown).

The effect of de-oxygenation and boron-adsorption were analyzed using X-ray diffraction, as shown in FIG. 3B. The diffraction peak of GO is located at 9.22°, which corresponds to an interlayer distance of 1.09 nm. The hydrothermal treatment with ammonia at 60° C. reduces the interlayer distance to 0.91 nm due to the de-oxygenation effect. However, the interlayer distance increases to 0.98 nm when the boron species were absorbed on the surface of NGO-60.

X-ray photon spectroscopy (XPS) was used to characterize the extent of nitrogen doping and the amount of boron adsorbed by quantitatively analyzing the element composition of the samples from peak area (C1s, N1s and B1s). FIG. 3C shows XPS profiles of NGO-x after boron absorption. An appearance in the peak of the B1s at ~192 eV indicates that boron absorption has occurred for the NGO. The nitrogen-doping causes N-GO to have an overall positive charge with respect to undoped GO. The increased surface charge induces an electrostatic attraction between the nitrogen-doped sites on the GO surface and the negatively charged $B(OH)_4^-$ species. As the $B(OH)_4^-$ species is brought close to the N-GO surface, hydrogen-bonding donor-acceptor interactions occur between the —OH from the boric acid/borate ion and the —OH/—NH— from N-GO and this results in the formation of a stable boron complex.

FIG. 3D further shows that the nitrogen content (N/C) of the samples has increased from 0.06 to 0.08 as reaction temperatures increased from 60 to 140° C. (not shown). This implies that there is an increasing amount of nitrogen content in the GO with increasing hydrothermal temperature. On the other hand, it can be observed that the B/C content is inversely proportional to the reaction temperature where the highest B/C ratio is 0.19 for NGO-60 sample. Hence, this suggests that 60° C. is the optimal temperature for the synthesis of N-GO with the highest boron adsorption capacity (FIG. 3A). This can be explained by considering the unique roles of both nitrogen and —OH functional groups where the former facilitates the localized positive attraction of boric acid to GO surfaces and the latter allows the formation of stable complex between boric acid and N-GO. However, as nitrogen doped results in the simultaneous deoxygenation of GO, an optimal condition is necessary. The high-resolution XPS N1s spectrum is illustrated in FIG. 3E for the GO and optimal sample N-GO-60. The main peak of N1s spectrum present at 397.75 eV corresponds to the pyridinic N while weaker peak comes from pyrrolic N (399.75 eV), and the minor peak is assigned to graphitic N (402 eV).

The high resolution XPS of B1s is shown in FIG. 3F. The B1s peak significantly blue-shifts to higher binding energy after a boron complex have formed. This might be due to a reduction effect from the N-GO. In the B1s peak for the N-GO-60+B, there are two peaks overlap together. The peak 191.75 eV can be likely attributed to the edge effects of the sample and the other minor peak can be assigned to the configuration shown at the center.

The Boron Kinetics Absorption of N-GO-60 and the Effect of pH Value.

Figure 4A:
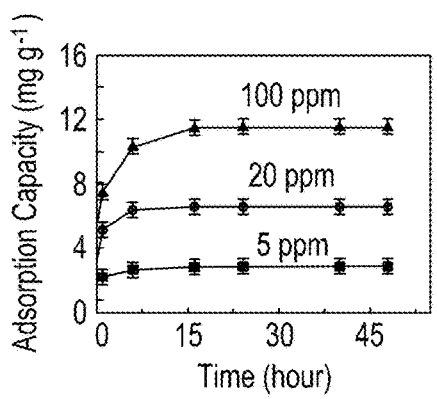
FIG. 4A shows the kinetics absorption of boron (25 ml boron feed solution with 20 ppm boron was mixed with 40 mg NGO-60)

In order to explore the kinetics adsorption of boron, the batch experiments were conducted at room temperature using 5 ppm, 20 ppm, and 100 ppm boron feed. The pH value was kept constant at the original value of the solutions (~8.5). The results obtained are shown in FIG. 4A. In general, the boron adsorption capacity increases with an increasing contact time until adsorption saturation. Based on the curve, an equilibrium is reached after twenty hours for these three solutions. The saturated adsorption capacity is 6.55 mg/g for solution with initial concentration of 20 ppm, which corresponds to 52.40% boron rejection. However, the feed concentration of 5 ppm delivers the highest efficient boron rejection, which can be up to 91.12%. When the amount of N-GO is increased to 110 mg from 40 mg using 25 ml, 5 ppm feed, 0.0630 ppm boron product can be obtained in the product solution prepared with deionized water, and the boron rejection rate is calculated to be up to 98.74%.

Figure 4B:
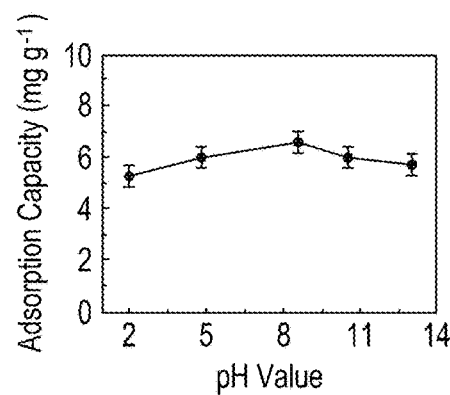
FIG. 4B shows the effect of pH value of NGO-60.

As shown in previous reports, the pH value plays an important role in the boron adsorption process. Therefore, it was investigated the pH effect and the results are shown in FIG. 4B. The experiments were carried out with initial concentration of 20 ppm B with 25 ml feed. 40 mg of N-GO-60 media was added in the batch testing. The pH value was adjusted with HCl or NaOH. The mixture was stirred for 48 hours followed by centrifuge or filtration with 220 nm nylon filter paper, the filtered solution was collected for boron analysis. As displayed in FIG. 4B, N-GO-60 shows a high selectivity for the boron at pH 8.6. The lowest adsorption capacity was achieved at pH ~2.0. The pH value in the solution controls the distribution of boric acid molecular and borate ion, which can affect the efficiency of boron removal. At low pH levels, boric acid predominates in the aqueous solution. This uncharged species will suppress the complex formation and result in low boron removal efficiency. At high pH (>9) levels, borate ion is the primary species in solution. However, as the boron complex at basic pH is carried out by hydroxyl groups on GO surfaces, this implies that the surface of N-GO-60 is more negatively charged in the basic media due to high OH ions present in the solution, which results in low boron loading. The favorable pH range is shown to be between 6 and 10. Despite this, the influence of pH in the media only resulted in a small fluctuation of boron adsorption capacity (maximum 20% over pH 2-13 range). It is noted that sea water has a pH value (8.4), which is within the highest adsorption range for the present materials. This indicates that the N-GO-60 can be highly useful for sea water boron ion removal.

Boron Adsorption Equilibrium Isotherm, the Adsorption Performance in Real Seawater, and the Regeneration Of N-GO-60 .

Langmuir isotherm model was chosen to analyze boron adsorption equilibrium isotherm based the adsorption data. The equation of Langmuir adsorption isotherm is presented as follows, $$q_e = \frac{Q_m K_L C_e}{1 + K_L C_e} \quad (2)$$

where $C_e$ is the equilibrium concentration of the adsorbate and $q_e$ is the adsorption capacity adsorbed at equilibrium, $Q_m$ is maximum adsorption capacity and $K_L$ is the Langmuir adsorption constant. As shown in FIG. 5A, $Q_m$ can be estimated as 58.70 mg/g, and $K_L$ is 0.00409 l/mg. The parameters of Langmuir adsorption isotherm are presented in the Table 2 (FIG. 5C). It was found that the Langmuir isotherm model represented the measured sorption data well based on the correlation coefficient of $R^2$=0.985. The performance comparison of the maximum adsorption capacity was conducted in the Table 3, FIG. 6. With an extremely high maximum adsorption capacity of 58.7 mg/g, this makes the N-GO the best reported sorbents to-date. The good correlation coefficient values imply a strictly localized monolayer sorption phenomenon occurring in the media. In the Langmuir sorption isotherm model, it is assumed that the sample surface is homogeneous, where the surface containing the adsorbing sites is perfectly flat plane with no corrugations. The huge amount of the surface area of graphene oxide with homogenous sorption patches and active sites from hydroxyl group of graphene oxide may lead to high adsorption capacity.

In order to evaluate the interference from other ions or molecules, a comparison study is conducted as shown in the insertion of FIG. 5A. In a feed solution prepared with deionized water, the adsorption capacity is 2.84 mg/g N-GO-60. The real seawater with 2.67 ppm boron was collected from the ocean of East Coast Park, Singapore. Pre-filtration was conducted to remove the particles. Additional boric acid was added to reach the average 5 ppm boron as feed. The adsorption capacity drops a little to 2.42 mg/g N-GO, which suggests that as high as 85% adsorption capacity can be maintained even in real seawater. This implies that the nitrogen doped graphene oxide is unreactive to other ions or molecules and is highly selective towards boron.

As shown in FIG. 5B, this boron removal media can be regenerated with acid, which means that the trapped boron can be removed from the exhausted N-GO through the addition of an acid solution (HCl or $H_2SO_4$) into the media. Strong acids were required to break down the formed association of borate-NGO complex, where boron was released to elute. 5% HCl was chosen for regeneration. 3-5 bed volume (BV) HCl of an aqueous solution is very effective with a 1 hour contact time for the removal of boron from N-GO. After that, 3-5 BV of 2% NaOH rinse was used as neutralization step to neutralize the added acid, followed by the 8-10 BV DI water rinse. After regeneration, the N-GO media may be reused for the next loading cycle. The regenerated result is shown in FIG. 5B, four cycles were carried out during the test. After regeneration, the capacity still can be maintained at ~86% and ~81% for the $2^{nd}$ and $3^{rd}$ cycles. Based on the image of inserted SEM in FIG. 5B, after four cycles, the morphology of NGO keep the same, which indicates that it can be continued to recycle.

Boron Removal Mechanism.

Figures 7A, 7B:
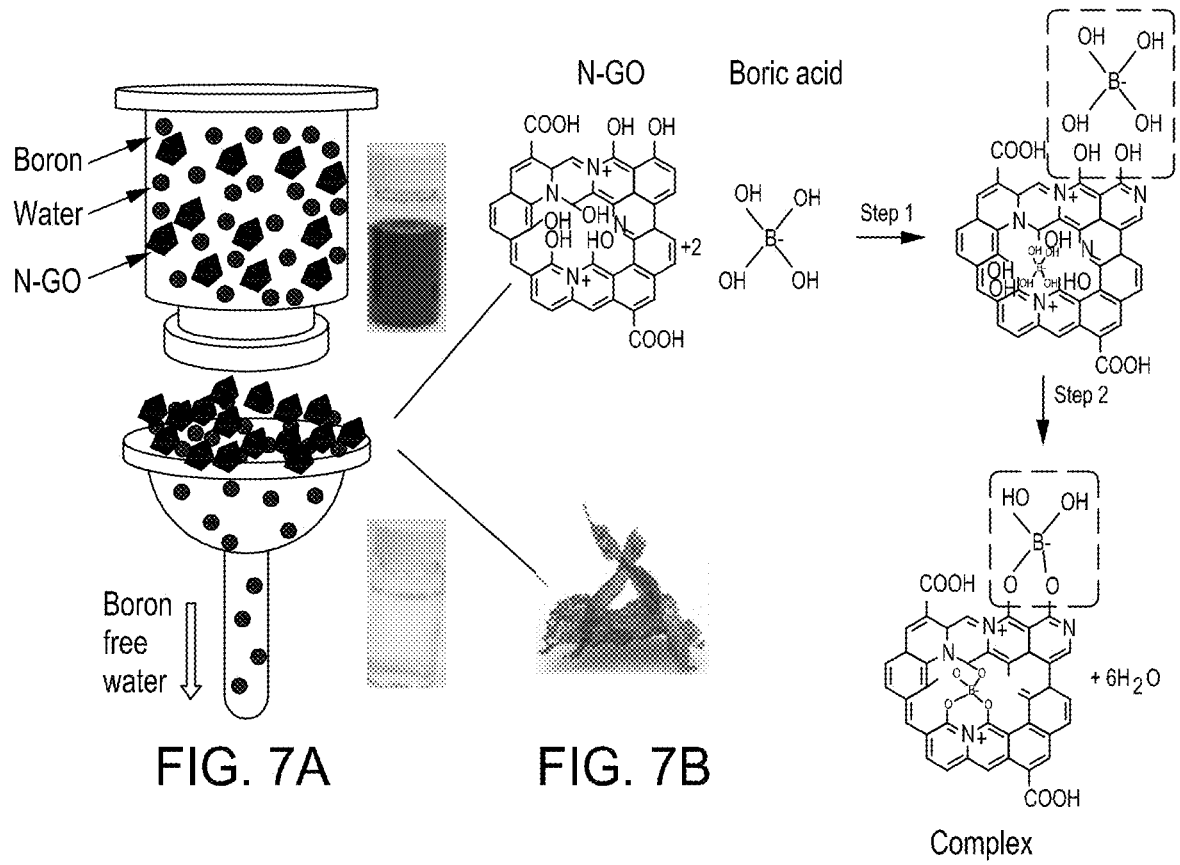
FIG. 7A shows schematic representation of the boron removal by filtration process.
FIG. 7B shows schematic diagrams for removing boron by N-GO.

Boron atoms exist in the form of negatively charged $B(OH)_4^-$ ion and boric acid. It is known that some compounds with adjacent hydroxyl groups have a good affinity to boron acid or borate ions. The possible reaction mechanism for the removal of boron appears to be the formation of complexes, and a schematic diagram of the reaction pathway is shown in FIGS. 7A and 7B. The removal of boron ions occurs in two steps, physisorption of boron ions and chemical bonding of boron ions to specific sites. Since GO is intrinsically negatively charged, boron ions are electrostatically repelled from the surface of GO and that results in a low adsorption capacity. Nitrogen doped of GO has two advantageous effects: (1) increased electrostatic attraction of $B(OH)_4^-$ ions to N-GO surface and (2) enhancement in binding sites. Firstly, the presence of nitrogen atoms induces a positive charge density in the carbon atoms adjacent to them and this will result in an enhanced adsorption of boron ions to the surface of N-GO. Secondly, —OH groups attached to carbon atoms adjacent to nitrogen doped sites experience increased affinity to boron ions and are able to form complexes more effectively. In order to show the function of N doping for GO modification, it is also measured the zeta potential for both GO and N-GO (not shown) and the result shows an improvement in surface charge for N-GO over GO. The overall zeta potential for N-GO is still negative because induced positive charges are only localized at nitrogen doping sites. The enhancement in binding sites is further verified through Density Functional Theory (DFT) calculations. The bonding energies for N-GO and GO are calculated (not shown) as −2.67 eV and −1.87 eV, respectively, which indicates higher possibility to promote the chemical reaction reacted for the N-GO.

Example 2 Full Range Boron Measurement in Aqueous Solutions

In this example, a simple and efficient method and apparatus to determine boron concentration using conductometric measurement techniques in the aqueous solution based on the chemical reaction between boric acid and novel reagent, pyridoxine are disclosed. The pyridinic-N in pyridoxine can enhance the highly ionized complex formation between boric acid and pyridoxine. The boron concentration in sample is proportional to the conductivity difference caused by the ionized complex formation of boric acid and pyridoxine. The process diagram is designed to detect the full range of boron concentration (ppb, ppm level) based on the background measurement of pyridoxine/boron-free water, as well as a simplified one which is suitable for ppm level monitor with direct pyridoxine dosage.

Figure 8:
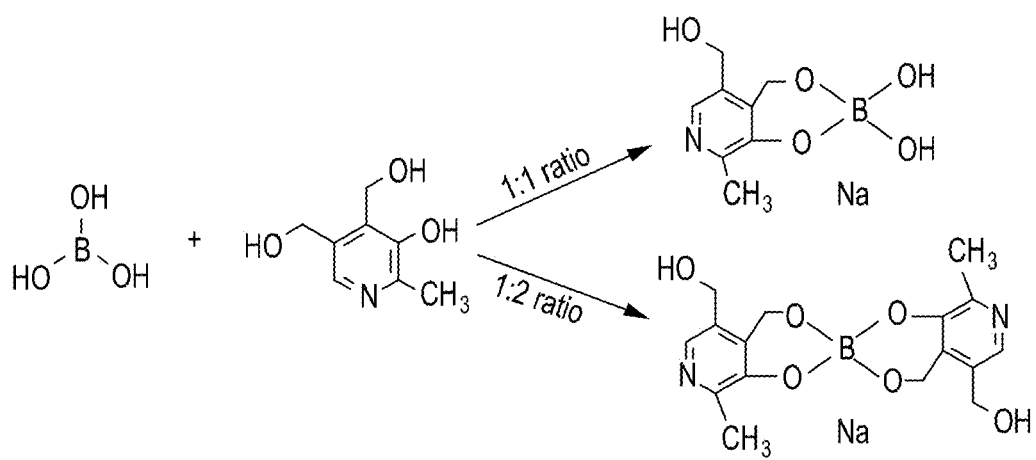
FIG. 8 shows the ionized complex structure of boric acid and pyridoxine with (1:1) and (1:2) species ratio.

With reference to FIG. 8, it shows a possible reaction between boric acid and pyridoxine. This has been proven that pyridoxine has a good affinity to boron in aqueous solutions. It is known that some compounds with adjacent hydroxyl groups show an appreciable tendency to form complexes with boric acid and borate ions. The predominant mechanism appears to be the formation of pyridoxine-boron complexes. The complexes containing one pyridoxine per boric acid could be formed with the following (1:1) structure shown in FIGS. 8, and (1:2) stable species ratio when two molecules of pyridoxine is involved.

Figure 9:
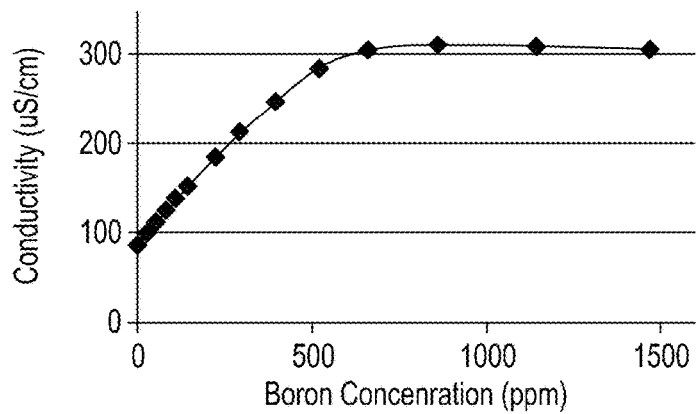
FIG. 9 shows the boron concentration vs. conductivity with the addition of boric acid into the 16960 ppm of pyridoxine solution in DI water.

FIG. 9 shows the boron concentration versus conductivity with the addition of boric acid into the 16960 ppm of pyridoxine solution in DI water. The measured boron concentration is from 0 ppm to 525 ppm. This response is slightly curved due to the chemometric analysis of the reactions in terms of conductivity. The conductivity of the sample stream is measured before and after injection of boric acid into solution. With the increased boric acid amount, the conductivity keep going up, which indicates that the highly ionized complex formation between boric acid and pyridoxine in the sample. The conductometric measurement can be detected due to the highly ionized nature of the reaction. When the free pyridoxine is consumed completely in solution, the conductivity will maintain or decrease a little with the increased boric acid concentration. The estimation shows the complexes between boric acid and pyridoxine could be formed with the (1:2) stable species molar ratio structure.

Figure 10A:
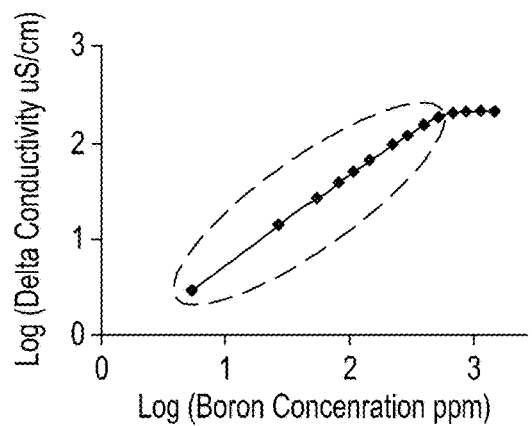
FIGS. 10A and 10B show the Log (Delta Conductivity uS/cm) vs. Log (Boron concentration ppm) in DI water.
Figure 10B:
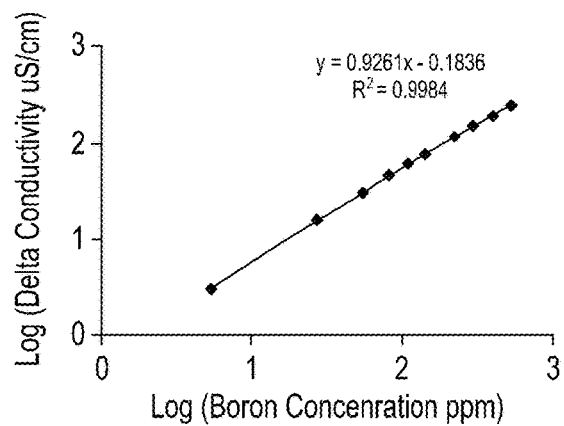

The log-log plot of the same data shown in FIG. 9 is presented in FIGS. 10A and 10B. The Y-axis shows the Log (delta conductivity) after pyridoxine conductivity is subtracted from the conductivity of pyridoxine/boron-containing samples. The linear part is taken and plotted in FIG. 10B with the slope 0.9261, the intercept −0.1836, and the R2 value of 0.9984, which illustrates that Log (delta conductivity) can be proportional to the log (boron ppm) mathematically. Thus the unknown boron concentration can be determined by the conductivity measurement.

Figure 11A:
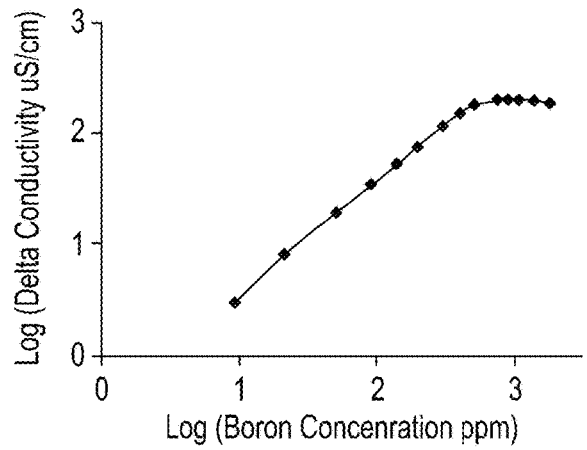
FIGS. 11A and 11B show the Log (Delta Conductivity uS/cm) vs. Log (Boron concentration ppm) in dilute seawater with diluted factor 163 times.
Figure 11B:
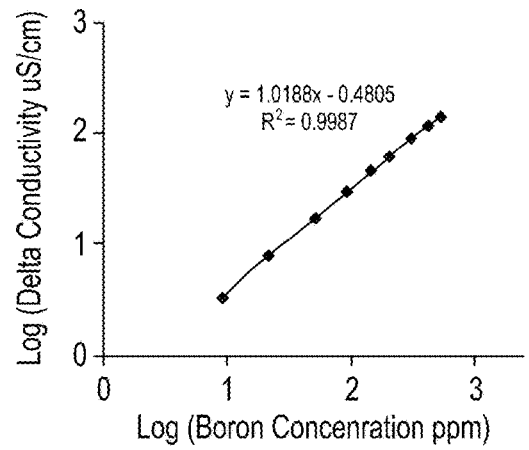

FIG. 11A and 11B show the linear behavior of Log (Delta Conductivity uS/cm) vs. Log (Boron concentration ppm) in dilute seawater with diluted factor 163 times. The R2 value is 0.9987, which illustrates that Log (delta conductivity) can be proportional to the log (boron ppm) mathematically. The linear behavior means that the reagent pyridoxine can only complex with boron, others even in seawater do not affect the boron measurement.

Figure 12:
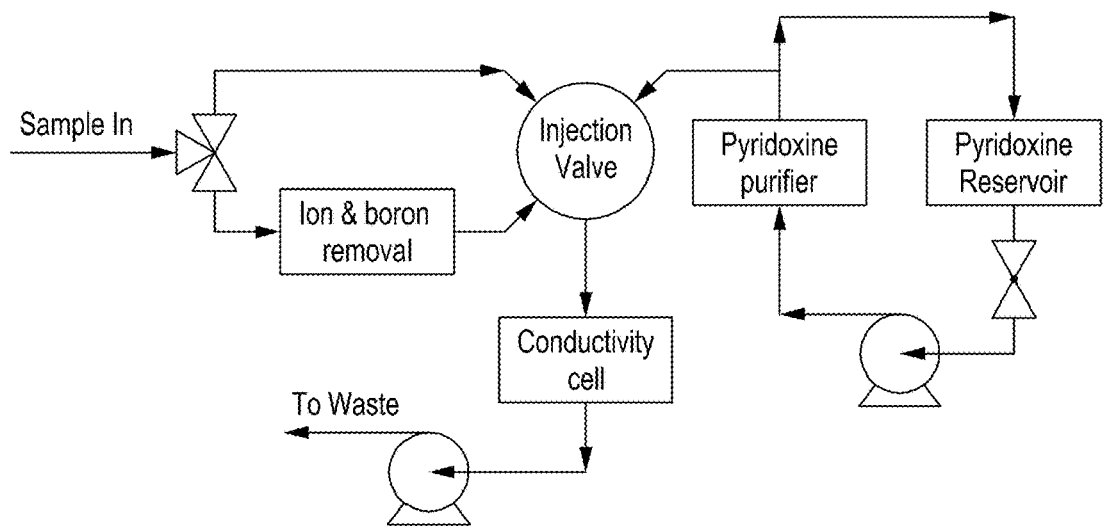
FIG. 12 shows the process diagram which can detect the full range of boron concentration (ppb and ppm).

To compare the ionized complex effect from pyridoxine, the conductivity from bare boric acid was measured. The results show that the conductivity will change from 1 to 8 uS/cm with the boron concentration 0-2000 ppm. This will not affect the ppm level boron measurement. However, regarding to the low boron concentration measurement, ultrapure water and pyridoxine are required. Additional process is needed to remove ions and boron in order to detect the ppb or even ppt level boron. The design diagram is shown in FIG. 12. Pyridoxine reagent is continuously recirculated through the reagent column to remove the ions and further purify pyridoxine. During the zero measurement to be made, ion and boron are removed before injection valve. Purified pyridoxine is dosed into the stream and causes a conductivity peak which is measured by the conductivity cell. During a sample measurement, the sample solution is sent directly to the injection valve. Sample conductivity is measured. When the reagent pyridoxine is injected, a higher conductivity peak can be observed due to the highly ionized complex formation between boron and pyridoxine. The concentration of boron in sample is proportional to the conductivity difference between the zero and sample conductivity peaks. Therefore, a highly accurate concentration measurement can be obtained. Due to the highly ionized property of the complex, very low levels of boron are detectable. This is suitable for the ppb even ppt, and ppm level boron measurement depending on the detected range of the conductivity cell.

Figure 13:
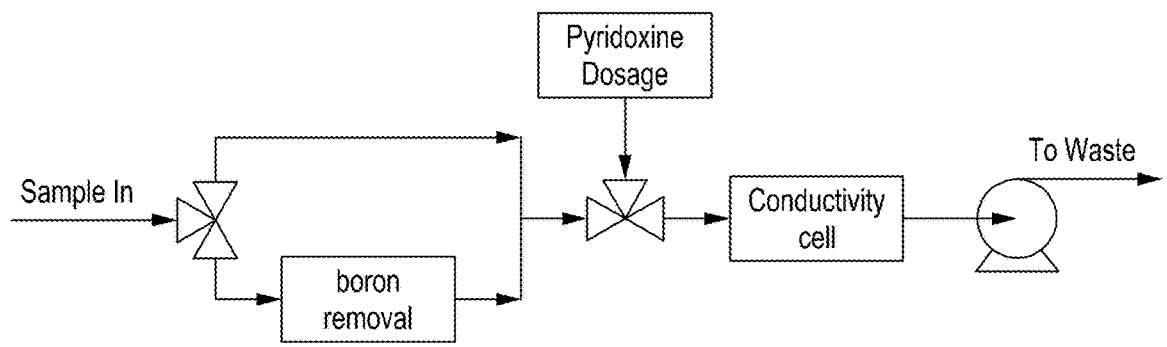
FIG. 13 shows the simplified process diagram which can detect the ppm level of boron concentration.

In order to measure directly ppm level boron, a simplified fluidic block diagram is shown in FIG. 13. The pyridoxine reagent is directly dosed into the zero stream and sample stream. The detected range of conductivity cell is in uS/cm.

In summary, a full range boron sensor is demonstrated based on the novel reagent, pyridoxine, which can react with boric acid to form an ionized complex. The boron concentration in sample is proportional to the conductivity difference caused by the ionized complex formation of boric acid and pyridoxine. The process diagram is designed to detect the full range of boron concentration (ppb, ppm level), as well as a simplified one which is suitable for ppm level monitor with direct pyridoxine dosage. This is the simple and effective technology for the boron measurement. This invention will be direct application in boron measurement field.

Example 3. Determination of Boron Concentration in Aqueous Solutions Based on Ionic Complex Formation In this example, a simple and effective method is proposed to determine the boron concentration by using electrical conductivity measurement techniques in the aqueous solution based on the ionized complex formed between boron species and vitamin B6. The conductivity of the ionized complex can be easily detected and accurately measured using a conductivity meter. The boron concentration in the sample is correlated to the conductivity caused by the ionized complex formation. This work provides a cost-effective technology for the boron measurement in various solutions, which will be of great industrial importance in boron measurement field.

Materials and Experimental Process.

Boric acid and vitamin B6 (≥98%) was purchased from Sigma-Aldrich. These chemicals were used as received without further purification. Seawater was collected from the ocean of East Coast Park, Singapore. Vitamin B6 was dissolved in DI water, or diluted seawater. The solution was aliquoted to several 50 ml beakers. The conductivity was measured with DDSJ-308F conductivity meter, and the reading was obtained after stirring and stability with the addition of boric acid. The actual boron concentration was analyzed by ICPE-9820 plasma atomic emission spectrometer.

Results and Discussion

Figure 14A:
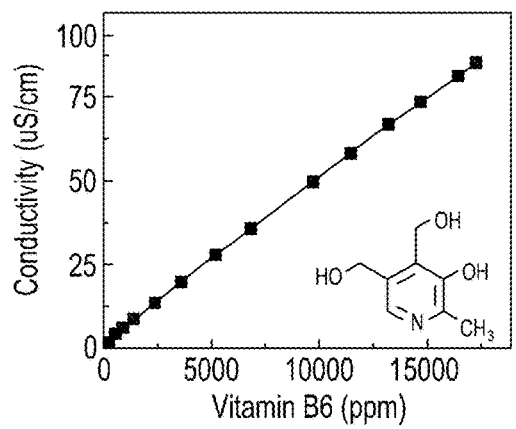
FIG. 14A shows the conductivity contribution from bare vitamin B6 in DI water.
Figure 14B:
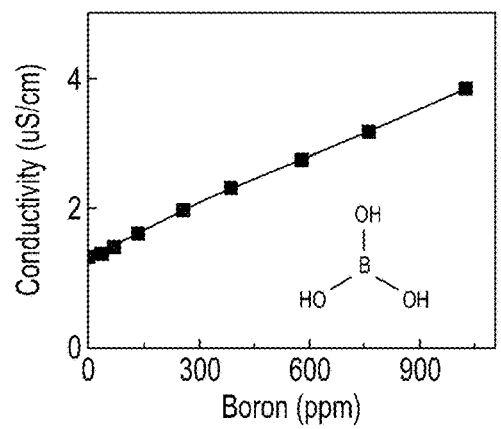
FIG. 14B shows the conductivity contribution from boric acid in DI water.
Figure 16A:
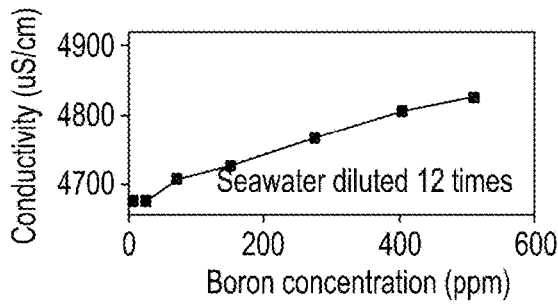
FIGS. 16A-16D show the performance comparisons in diluted seawater with a dilution factor of 12 (FIG. 16A), 34 (FIG. 16B), 124 (FIG. 16C), and in DI water (FIG. 16D)
Figure 16B:
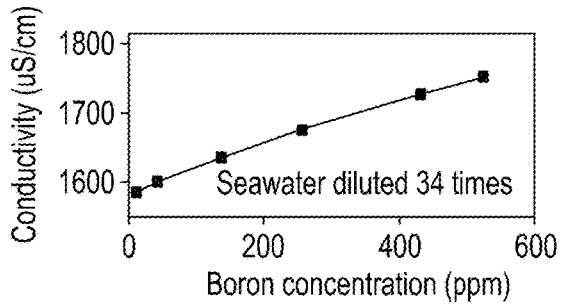
Figure 16C:
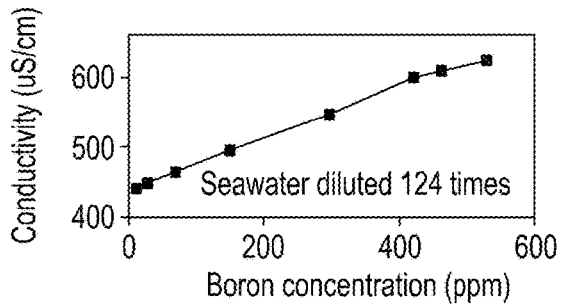
Figure 16D:
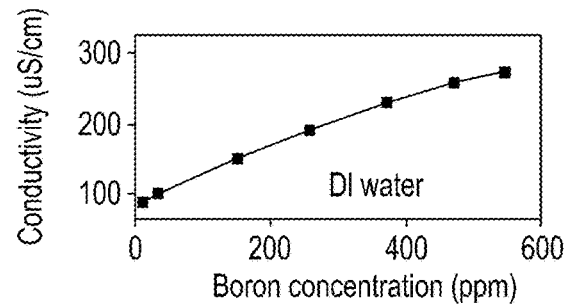
Figure 16E:
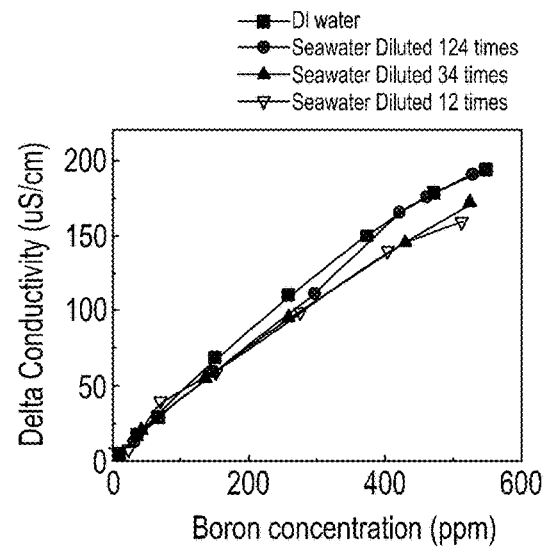
FIG. 16E shows the delta conductivity versus boron concentration.
Figure 16F:
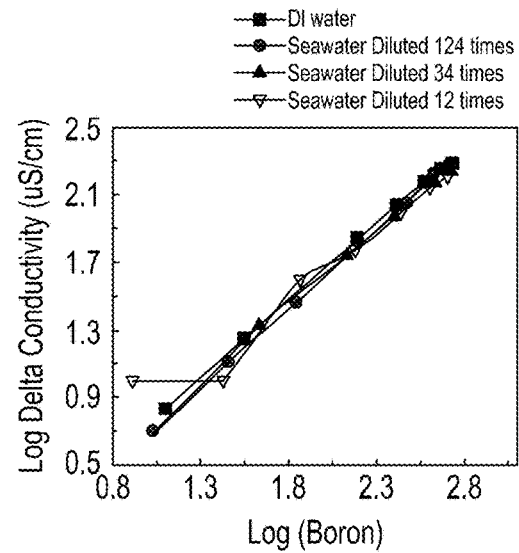
FIG. 16F shows the delta conductivity of FIG. 16E in the form of Log (delta conductivity) versus Log (boron concentration).
Figure 17A:
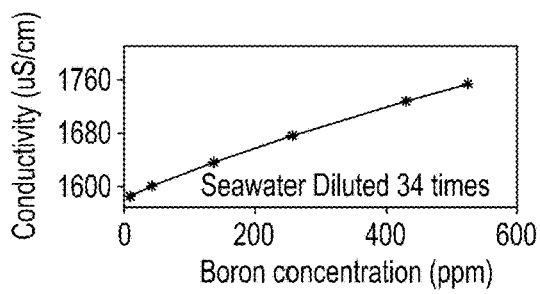
FIGS. 17A-17E show the performance comparisons in diluted seawater with a dilution factor of 34 (FIG. 17A), 45 (FIG. 17B), 66 (FIG. 17C), 124 (FIG. 17D), and in DI water (FIG. 17E)
Figure 17B:
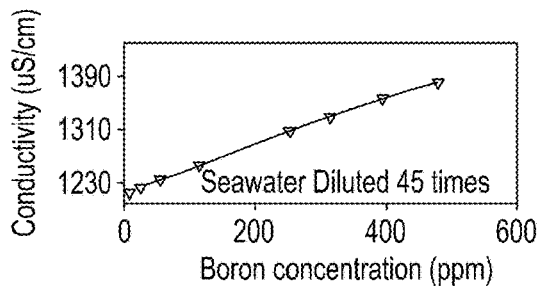
Figure 17C:
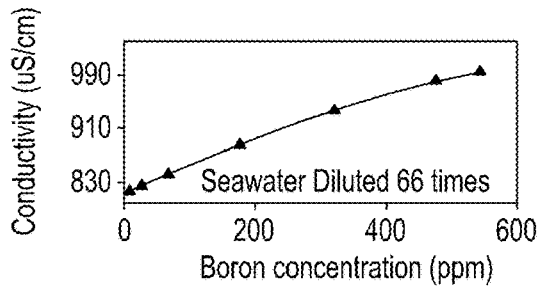
Figure 17D:
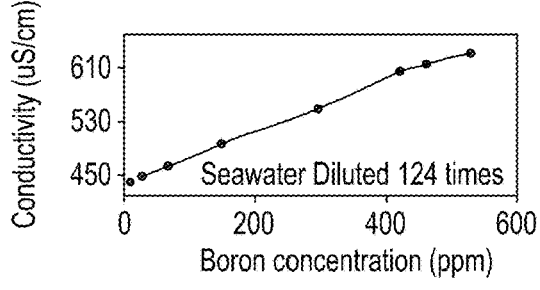
Figure 17E:
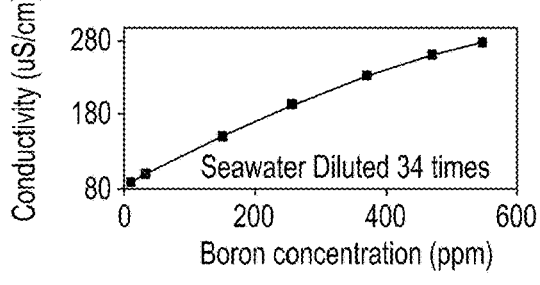
Figure 17F:
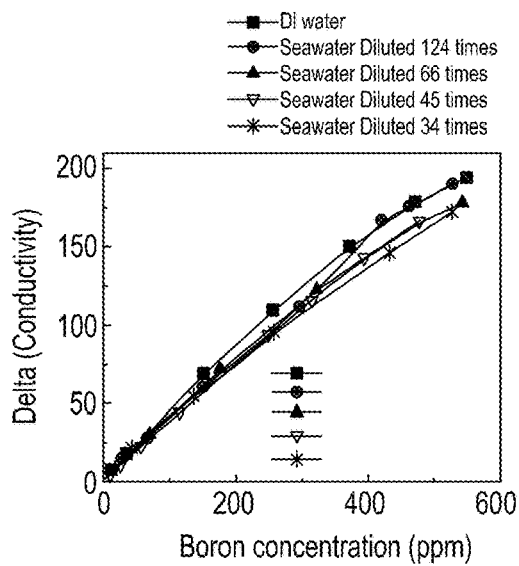
FIG. 17F shows the delta conductivity versus boron concentration.
Figure 17G:
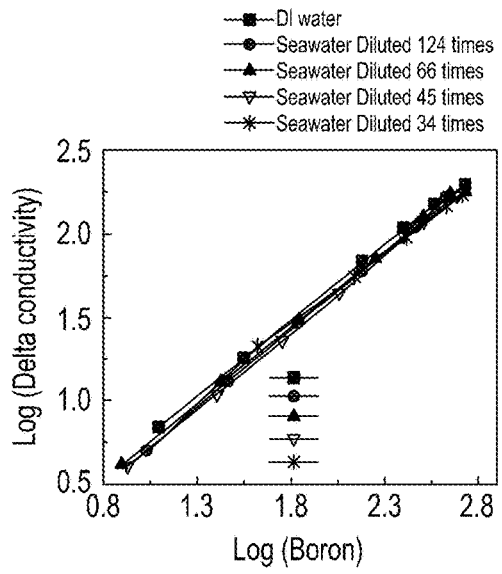
FIG. 17G shows the delta conductivity of FIG. 17F in the form of Log (delta conductivity) versus Log (boron concentration).

Both vitamin B6 and boric acid are non-conductive by themselves in the aqueous solutions. The conductivity from bare vitamin B6 or bare boric acid was measured, as shown in FIGS. 14A and 14B. The conductivity keeps going up with increased concentration. For vitamin B6, it is mainly due to the <2% impurity. It is possible that vitamin B6 itself ionizes to a small extent. Regarding the boric acid, about 3 uS/cm conductivity increment was contributed by 950 ppm boron, which is negligible. This will not affect boron measurement in the ppm range.

Boron is present in aqueous water as boric acid and borate ion. It is weakly ionized acid product in water, the pKa of $H_3BO_3/B(OH)_4^-$ is 9.2 at 25° C. Therefore, boric acid will dominate at normal drinking water, seawater, or DI water. The relation of the two species can be given by the following equation, as shown in Equation (3). It is known that some compounds with adjacent hydroxyl groups show an appreciable tendency to form complexes with boric acid and borate ions. It has been proven that boric species can easily react with vitamin B6, and the reaction is shown in Equation (4). Vitamin B6 has a good affinity to boron in aqueous solutions, and can form a highly ionized boron-vitamin B6 complex, which can cause a dramatic increase in electrical conductivity. With the consuming of borate ion during the complex formation, the equilibrium in Equation (3) is typically towards the right until the exhaust of vitamin B6.

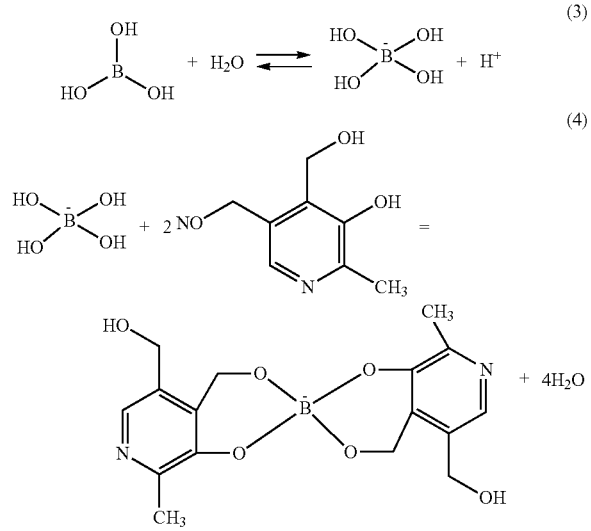

The measuring correlation between boron concentration and conductivity is presented in FIGS. 15A and 15B. The vertical axis shows the conductivity signal. The conductivity was obtained after stability of conductivity reading with the addition of boric acid. With the increased boric acid concentration, the conductivity keeps going up, which indicates the formation of highly ionized complex between boric acid and vitamin B6. When free vitamin B6 is completely exhausted in solution, the conductivity will maintain or even slightly decrease with the increased boric acid, as shown in saturated conductivity part in FIG. 15A. Within the area marked inside the dotted box, conductivity is proportional to the boron concentration. The measured boron concentration is from 0 ppm to 550 ppm. The lightly curved trend of conductivity is due to the chemometric analysis of the reactions. The dramatic change part of conductivity marked in the red area was re-plotted in the form of log-log as shown in FIG. 15B. The Y-axis shows the log (delta conductivity) after vitamin B6 conductivity is subtracted from that of vitamin B6/boron-containing samples. The log (delta conductivity) is linearly correlated to the log (boron concentration) with the slope 0.89782, the intercept −0.14152. It was found that the measured data can fit well with the correlation coefficient ($R^2$) of 0.99882, which means boron concentration can be accurately determined mathematically by the conductivity signal. The obtained parameters of fitting are presented in the Table 4 (FIG. 15C). In the current condition, the boron concentration can be empirically derived as below Equation (5). Thus the unknown boron content in aqueous sample can be quantified by the conductivity measurement.

$$\text{Boron Concentration} = 1.4376 \times (\text{Delta Conductivity})^{1.1138} \tag{5}$$

Herein it was noted that the purity of vitamin B6 is the key factor to influence the lower limit of detection. In the current test condition, there is still around 2% impurity in the reagent, which will affect the measurement of lower concentration. The procedure of pre-purification and deionization is required to remove these interfering ions for the super low boron determination. This step is of critical importance for accurate detection of ppb or ppt level. Another issue is that resolution of the conductivity meter. The meter of super low detection range and resolution is also necessary for low limit of detection. For example, nS/cm for ppb, even ppt level of boron detection, uS/cm for ppm level of boron detection.

In order to explore the application scope of this sensor, the diluted seawater was used as feed sample. The diluted factor was controlled at 12, 34, and 124 times, as shown in FIG. 16A-16F. Seawater was collected from the ocean of East Coast of Singapore, and the pre-filtration was carried out to remove the small particles. With the increased salt concentration, the delta conductivity becomes smaller and smaller, especially at the high boron concentration area. At the diluted factor of 12, the linear behavior of log-log is no longer valid, which means the measurement is not accurate. It is due to the serous interference caused by some ions or compounds in seawater. Therefore, this would be the upper limit in the current test. In order to test this hypothesis, several lower concentrations of diluted seawater samples were carried out with the diluted factor 124, 66, 45, 34, as presented in FIG. 17A-17G, the entire curves show the linear behavior. This demonstrates that the sensor can work well even at the diluted seawater within the 0-1,600 uS/cm range. Other ions or compounds in seawater do not affect the boron measurement.

Figure 18:
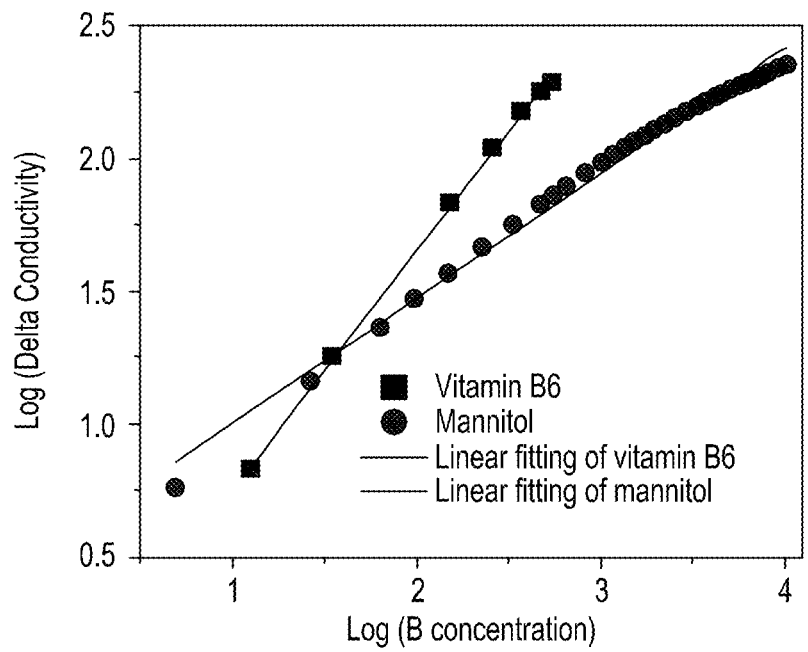
FIG. 18 shows the performance comparison of vitamin B6 and mannitol in ppm range as boron. Table 5 shows the fitting parameters of vitamin B6 and mannitol in ppm range as boron.

Mannitol is currently the most commonly used chemical reagent for boron determination. Herein, the performance comparison was conducted between mannitol and vitamin B6 prepared in DI water within the ppm range. As shown in FIG. 18 and the fitting parameters in Table 5, the $R^2$ is higher for vitamin B6 than that of mannitol, which means that it is more accurate for vitamin B6. The sensitivity is the other critical factor. The fitting value of slope shows a double improvement for the vitamin B6, compared with mannitol, which give the proof that vitamin B6 is much superior to mannitol in ppm range. It may be due to the enhanced ionized nature of complex between boric acid and vitamin B6 from the pyridinic-N.

Accordingly, vitamin B6 has been demonstrated as a novel reagent for a quick, accurate, economic, portable, and highly sensitive boron detector based on the conductance measurement techniques. It can react with boric acid to form an ionized complex resulting in a measurable increase of conductivity in aqueous solution. The true boron concentration in boron-containing sample has been found to be mathematically correlated to electrical conductivity difference. This sensor can be applicable in DI water or even diluted seawater within 0-1,600 uS/cm of feed samples, and there is trivial influence of interference observed. Some other ions or compounds in diluted seawater could interfere with the determination of boron, especially at the high salt concentration. Based on the performance comparison between vitamin B6 and mannitol, it can be concluded that both accurateness and sensitivity of vitamin B6 are much superior in ppm range, compared with that of mannitol due to the enhanced ionized complex formation from the pyridinic-N in vitamin B6. This is a simple and effective technology for highly accurate boron measurement in the aqueous solution, and suitable for online analyzer. This invention will have direct applications in boron measurement field.

By "comprising" it is meant including, but not limited to, whatever follows the word "comprising". Thus, use of the term "comprising" indicates that the listed elements are required or mandatory, but that other elements are optional and may or may not be present.

By "consisting of" is meant including, and limited to, whatever follows the phrase "consisting of". Thus, the phrase "consisting of" indicates that the listed elements are required or mandatory, and that no other elements may be present.

The inventions illustratively described herein may suitably be practiced in the absence of any element or elements, limitation or limitations, not specifically disclosed herein. Thus, for example, the terms "comprising", "including", "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the inventions embodied therein herein disclosed may be resorted to by those skilled in the art, and that such modifications and variations are considered to be within the scope of this invention.

By "about" in relation to a given numerical value, such as for temperature and period of time, it is meant to include numerical values within 10% of the specified value.

The invention has been described broadly and generically herein. Each of the narrower species and sub-generic groupings falling within the generic disclosure also form part of the invention. This includes the generic description of the invention with a proviso or negative limitation removing any subject matter from the genus, regardless of whether or not the excised material is specifically recited herein.

Other embodiments are within the following claims and non-limiting examples. In addition, where features or aspects of the invention are described in terms of Markush groups, those skilled in the art will recognize that the invention is also thereby described in terms of any individual member or subgroup of members of the Markush group.

What is claimed is:

1. A method of removing or reducing an amount of boron present in an aqueous solution, wherein the boron exists in a form of boric acid in the aqueous solution, the method comprising:

contacting a boron removal medium with the aqueous solution, wherein the boron removal medium comprises graphene oxide, at least two hydroxyl groups directly covalently bonded to the graphene oxide, and a pyridinic nitrogen directly covalently bonded to the graphene oxide; and separating the boron removal medium from the aqueous solution.

2. The method according to claim 1, wherein separating the boron removal medium from the aqueous solution comprises one of centrifuging or filtering the aqueous solution or passing the aqueous solution through the boron removal medium.

\* \* \* \* \*